US010829135B2

(12) United States Patent
Anderson et al.

(10) Patent No.: US 10,829,135 B2
(45) Date of Patent: Nov. 10, 2020

(54) RAILWAY MONITORING SYSTEM AND METHOD

(71) Applicant: International Business Machines Corporation, Armonk, NY (US)

(72) Inventors: Evelyn R. Anderson, Houston, TX (US); Kristen Conley, Kieler, WI (US); Martin G. Keen, Cary, NC (US); Natalie Brooks Powell, Bolingbrook, IL (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 15/962,342

(22) Filed: Apr. 25, 2018

(65) Prior Publication Data

US 2019/0329806 A1    Oct. 31, 2019

(51) Int. Cl.
| | |
|---|---|
| *G06T 7/00* | (2017.01) |
| *B61L 23/04* | (2006.01) |
| *B64C 39/02* | (2006.01) |

(52) U.S. Cl.
CPC ............ *B61L 23/04* (2013.01); *B64C 39/024* (2013.01); *G06T 7/0004* (2013.01); *B64C 2201/127* (2013.01); *G06T 2207/10032* (2013.01); *G06T 2207/30184* (2013.01); *G06T 2207/30236* (2013.01)

(58) Field of Classification Search
USPC .......................................................... 701/19
See application file for complete search history.

(56) References Cited

U.S. PATENT DOCUMENTS

| | | | |
|---|---|---|---|
| 10,308,265 B2 * | 6/2019 | Fahmy ................ | B61L 27/0088 |
| 2012/0274772 A1 | 11/2012 | Fosburgh et al. | |
| 2012/0300060 A1 | 11/2012 | Farritor | |

(Continued)

FOREIGN PATENT DOCUMENTS

| | | |
|---|---|---|
| CN | 101142462 A | 3/2008 |
| DE | 102011006333 A1 | 10/2012 |
| WO | WO2013121344 A2 | 8/2013 |

OTHER PUBLICATIONS

Flammini et al., "Towards Automated Drone Surveillance in Railways: State-of-the-Art and Future Directions," Advanced Concepts for Intelligent Vision Systems, Proceedings, 17th International Conference, ACIVS 2016, Lecce, Italy, Oct. 24-27, 2016, pp. 336-348.

*Primary Examiner* — James M McPherson
(74) *Attorney, Agent, or Firm* — Yee & Associates, P.C.

(57) ABSTRACT

A method, an apparatus, a system, and a computer program product for managing safety for a railway system. A computer system generates a probability of a safety issue for a particular section of a railroad track in the railway system using information from a set of weather event sources. A set of unmanned aerial vehicles is dispatched to the particular section of the railroad track when the probability of the safety issue exceeds a threshold. A number of images of the particular section of the railroad track is received from the set of unmanned aerial vehicles. A risk score for the safety issue at the particular section of the railroad track is generated using the number of images by the computer system. An action is performed to resolve the safety issue using the risk score, enabling the computer system to manage safety issues for the railway system.

14 Claims, 5 Drawing Sheets

(56) References Cited

U.S. PATENT DOCUMENTS

| | | | | |
|---|---|---|---|---|
| 2015/0339919 A1* | 11/2015 | Barnett et al. | ........... | G08G 1/07 |
| 2017/0313332 A1* | 11/2017 | Paget et al. | ........... | B61L 25/021 |
| 2018/0027772 A1* | 2/2018 | Gordon et al. | ...... | A01K 15/023 |
| 2018/0127006 A1* | 5/2018 | Wade | .................. | B61L 27/0088 |
| 2019/0054937 A1* | 2/2019 | Graetz et al. | ........... | B61L 23/04 |

* cited by examiner

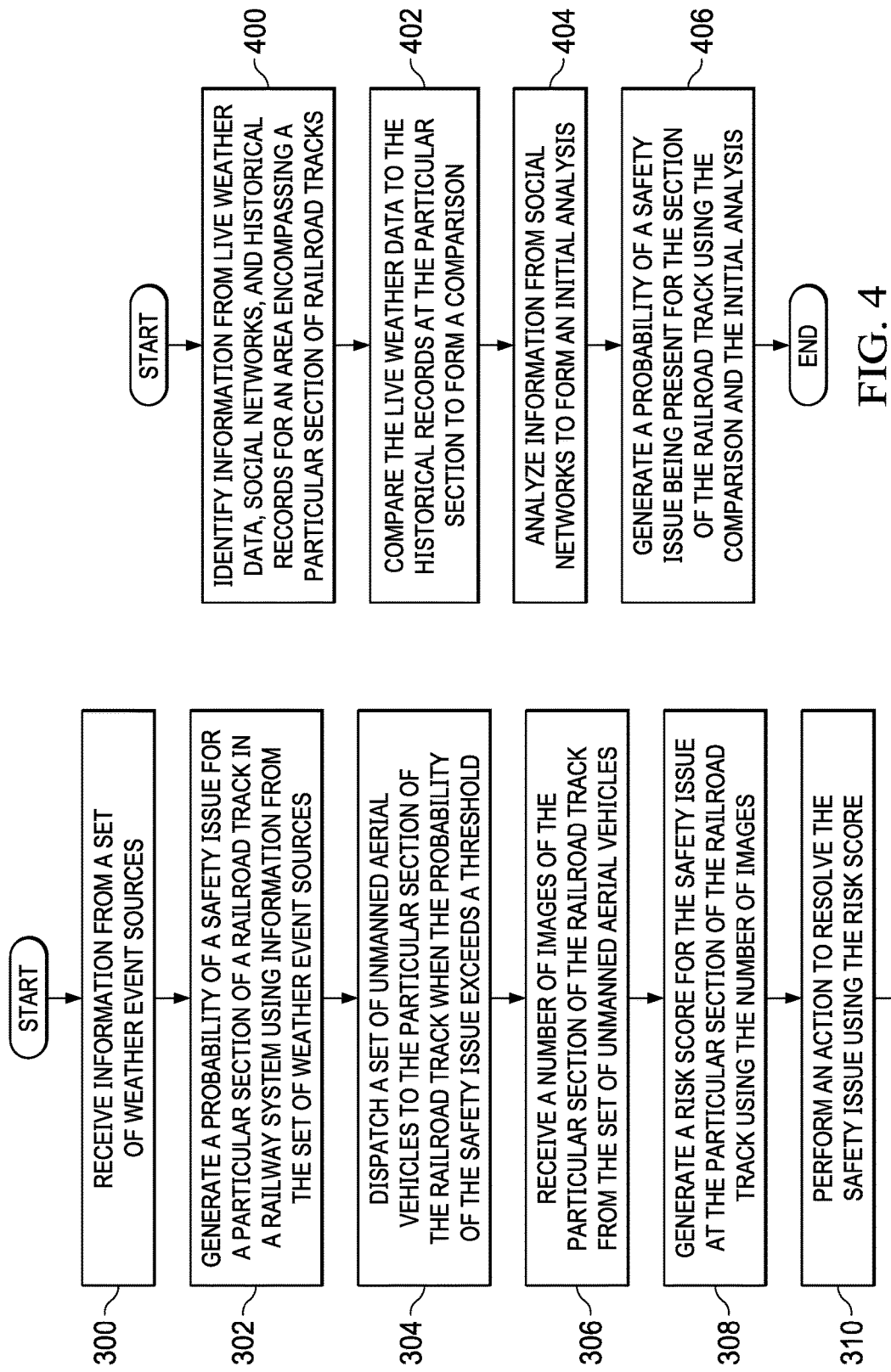

RAILWAY MONITORING SYSTEM AND METHOD

BACKGROUND

1. Field

The disclosure relates generally to an improved computer system and, more specifically, to a method, an apparatus, a system, and a computer program product for managing safety for a railway system.

2. Description of the Related Art

Railway systems can be adversely affected by weather events. For example, thunderstorms and heavy rains can cause a creek to overflow and wash away a track support for a section of a railroad track in a railway system. Thunderstorms and heavy rains can also cause a tree to fall onto another section of the railroad track. Water erosion under a railroad track can occur from heavy rains and flooding. These conditions affect how safely trains can operate in the railway system.

Currently, safety issues can be detected through electrical current detection. An electrical current can be run through metal rails in a railroad track. The safety issues can be identified when the electrical current no longer flows through a section of the railroad track, indicating a break is present in the railroad track. Safety issues can also be identified by railroad personnel driving on roads near the track and visually spotting the safety issues. Further, safety issues can be identified from receiving a notification from a derailed train. None of these current techniques are ideal for comprehensive detection of safety issues that may occur as a result of weather events.

Therefore, it would be desirable to have a method and apparatus that take into account at least some of the issues discussed above, as well as other possible issues. For example, it would be desirable to have a method and apparatus that overcome a technical problem with detecting safety issues with railroad tracks in a railway system.

SUMMARY

According to one embodiment of the present invention, a method for managing safety for a railway system is provided. A computer system generates a probability of a safety issue for a particular section of a railroad track in the railway system using information from a set of weather event sources. A set of unmanned aerial vehicles is dispatched to the particular section of the railroad track when the probability of the safety issue exceeds a threshold. A number of images of the particular section of the railroad track is received from the set of unmanned aerial vehicles. A risk score for the safety issue at the particular section of the railroad track is generated using the number of images by the computer system. An action is performed to resolve the safety issue using the risk score, enabling the computer system to manage safety issues for the railway system.

According to another embodiment of the present invention, a railway monitoring system comprising a computer system and a railway manager running on the computer system is provided. The railway manager generates a probability of a safety issue for a particular section of a railroad track in the railway system using information from a set of weather event sources. The railway manager dispatches a set of unmanned aerial vehicles to the particular section of the railroad track when the probability of the safety issue exceeds a threshold and receives a number of images of the particular section of the railroad track from the set of unmanned aerial vehicles. The railway manager generates a risk score for the safety issue at the particular section of the railroad track using the number of images and performs an action to resolve the safety issue using the risk score, enabling the computer system to manage safety issues for the railway system.

According to yet another embodiment of the present invention, a computer program product for managing safety for a railway system is provided. The computer program product comprises a computer-readable storage media; and first program code, second program code, third program code, fourth program code, and fifth program code which are all stored on the computer-readable storage media. The first program code generates a probability of a safety issue for a particular section of a railroad track in the railway system using information from a set of weather event sources. The second program code dispatches a set of unmanned aerial vehicles to the particular section of the railroad track when the probability of the safety issue exceeds a threshold. The third program code receives a number of images of the particular section of the railroad track from the set of unmanned aerial vehicles. The fourth program code generates a risk score for the safety issue at the particular section of the railroad track using the number of images. The fifth program code performs an action to resolve the safety issue using the risk score, enabling the computer system to manage safety issues for the railway system.

BRIEF DESCRIPTION OF THE DRAWINGS

FIG. 3 is a flowchart of a process for managing safety for a railway system in accordance with an illustrative embodiment;

FIG. 4 is a flowchart of a process for generating a probability of a safety issue in accordance with an illustrative embodiment;

DETAILED DESCRIPTION

Figure 1:
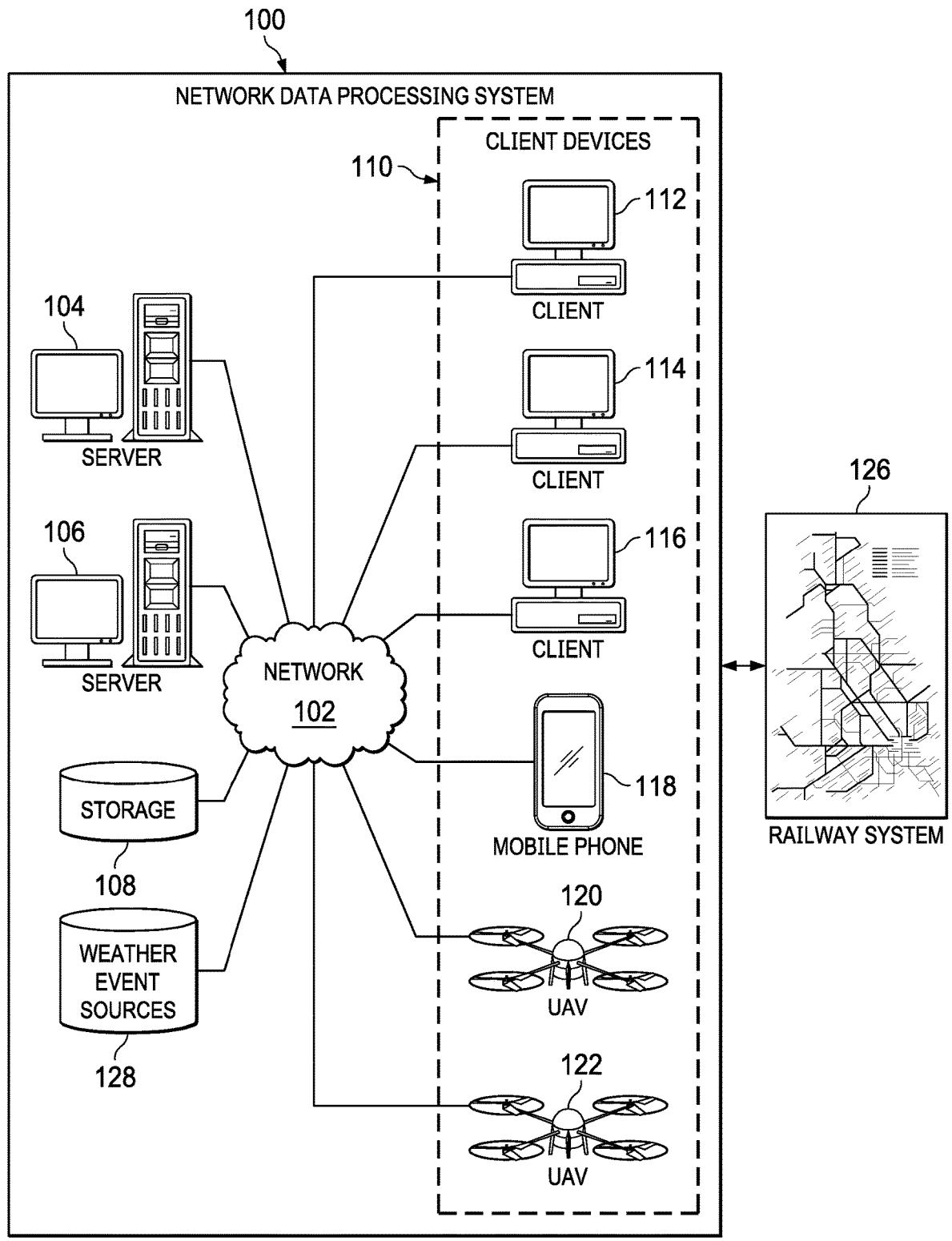
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. For example, the illustrative embodiments recognize and take into account that detecting breaks in electrical currents running through railroad tracks is not ideal. For example, the illustrative embodiments recognize and take into account that washed-away track support and a tree on a railroad track will not cause a break in an electrical current through the railroad track. The illustrative embodiments recognize and take into account that having railroad personnel riding roads near railroad tracks to visually spot these issues is a time consuming and personnel intensive process. Further, in rural areas, railroad tracks are often away from roads, making visually spotting safety issues more difficult. The illustrative embodiments recognize and take into account that a notification from a derailed train encountering a section of track with lost track support or a tree on the track is not ideal because an accident has already occurred.

The illustrative embodiments recognize and take into account that safety issues can be identified from the air using helicopters. However, the illustrative embodiments recognize and take into account that many stretches for railroad tracks are tree-lined with canopies from the trees blocking a view of the railroad tracks. The illustrative embodiments recognize and take into account that this situation makes the use of helicopters difficult or infeasible in those types of areas.

Thus, the illustrative embodiments provide a method, an apparatus, a system, and a computer program product for managing safety for a railway system. In one illustrative example, a computer system generates a probability of a safety issue for a particular section of a railroad track in the railway system using information from a set of weather event sources. The computer system dispatches a set of unmanned aerial vehicles to the particular section of the railroad track when the probability of the safety issue exceeds a threshold. The computer system receives a number of images of the particular section of the railroad track from the set of unmanned aerial vehicles.

The computer system generates a risk score for the safety issue at the particular section of the railroad track using the number of images. The computer system performs an action using the risk score. The action may resolve the safety issue. In this manner, the computer system is enabled to manage safety issues for the railway system in a manner that is more efficient as compared to current systems.

As used herein, "a set of," when used with reference to items, means one or more items. For example, "a set of unmanned aerial vehicles" is one or more unmanned aerial vehicles. Further, "a number of," when used with reference to items, means one or more items. For example, "a number of images" is one or more images.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, unmanned aerial vehicle (UAV) 120, and unmanned aerial vehicle (UAV) 122. In this illustrative example, some or all of client devices 110 may form an Internet of things (IOT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative examples, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, network data processing system 100 operates to manage safety issues for railway system 126. For example, server computer 104 can receive information from weather event sources 128. Server computer 104 can analyze the information and selectively dispatch one or more unmanned aerial vehicles, such as unmanned aerial vehicle 120 and unmanned aerial vehicle 122, to railway system 126. Unmanned aerial vehicle 120 and unmanned aerial vehicle 122 take pictures of railway system 126 and send the images to server computer 104 for use in generating an analysis about one or more safety issues that may be present in railway system 126. The analysis can be used to perform actions with respect to any safety issues that may be identified. These actions include, for example, shutting down a section of railway system 126, sending out personnel for a more detailed inspection, rerouting trains, or other suitable actions with respect to railway system 126.

Figure 2:
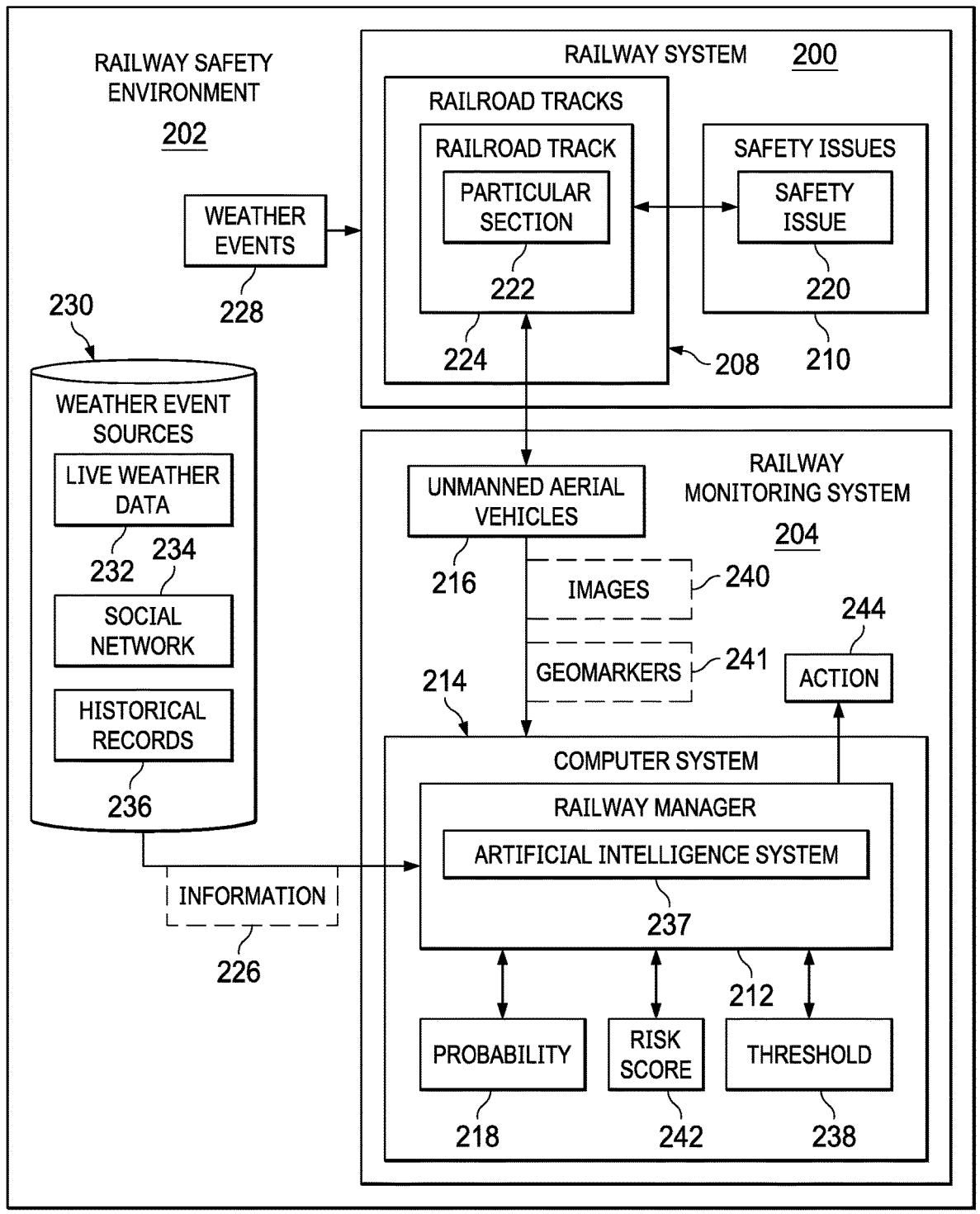
FIG. 2 is a block diagram of a railway safety environment in accordance with an illustrative embodiment.

With reference now to FIG. 2, a block diagram of a railway safety environment is depicted in accordance with an illustrative embodiment. As depicted in this figure, railway system 200 in railway safety environment 202 is managed by railway monitoring system 204. Network data processing system 100 in FIG. 1 is an example of hardware components that may be used in railway monitoring system 204.

In this illustrative example, railway monitoring system 204 operates to manage safety issues 210 with respect to railroad tracks 208 in railway system 200. As depicted, railway monitoring system 204 comprises a number of different components. In this example, railway monitoring system 204 comprises railway manager 212, computer system 214, and unmanned area vehicles (UAVs) 216. Railway manager 212 runs on computer system 214.

Computer system 214 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system. Computer system 214 may be implemented using one or more data processing systems within network data processing system 100 in FIG. 1.

As depicted, railway manager 212 generates probability 218 of safety issue 220 in safety issues 210 being present for particular section 222 of railroad track 224 in railroad tracks 208 in railway system 200. In this illustrative example, safety issue 220 at particular section 222 of railroad track 224 can be selected from a group comprising flooding of railroad track 224, potential flooding of railroad track 224, flooding under or below railroad track 224, erosion, an obstruction on railroad track 224, the obstruction with in a selected distance of railroad track 224, a fallen tree on railroad track 224, a mudslide on railroad track 224, a rockslide on railroad track 224, a car on railroad track 224, and other safety issues that may occur for particular section 222 of railroad track 224.

As depicted, probability 218 is generated using information 226 about weather events 228 from a set of weather event sources 230. Weather events 228 are events that can affect railway system 200 in this illustrative example.

In this illustrative example, probability 218 can take various forms. For example, probability 218 may be a percentage from zero percent to 100 percent, a value from zero to one, or some other suitable form. In another example, probability 218 may be a label such as "none," "low," "moderate," "high," and "extremely high."

In this illustrative example, weather event sources 230 can comprise at least one of live weather data 232, social network 234, historical records 236, or other sources of information 226 relating to weather events 228. In the illustrative example, live weather data 232 includes the most current data available about weather conditions. These weather conditions include information about temperature, lightning strikes, rainfall, thunderstorms, snow, or other weather conditions. Live weather data 232 can be used by railway manager 212 to identify probability 218 for safety issue 220 of, such as, for example, flooding or objects, such as a fallen tree, on railroad track 224.

As depicted, social network 234 comprises at least one of websites, mobile applications, or other interfaces that can be used to create and share information, network, or other interactions between people. Social network 234 can be, for example, Facebook, which is available from Facebook Inc.; LinkedIn, which is available from Microsoft Corporation; or other types of social networks.

Railway manager 212 can analyze images of locations adjacent to or near railroad track 224 that have been posted to social network 234. These pictures can be analyzed to identify probability 218 of safety issue 220 for particular section 222 of railroad track 224. For example, an image of a flooded river or an image of fallen trees indicating high winds in a location within a few hundred yards for a mile of particular section 222 of railroad track 224 can be used in determining probability 218 of safety issue 220 for particular section 222 of railroad track 224.

In this illustrative example, historical records 236 can be compared to current conditions identified in live weather data 232. This comparison can be used to determine probability 218 of safety issue 220 for particular section 222 of railroad track 224. For example, historical records 236 may indicate that the last time particular section 222 experienced five inches of rain over a period of two days, flooding resulted which impacted particular section 222 of railroad track 224. Similar weather conditions identified through live weather data 232 may increase the probability of flooding occurring again for particular section 222 of railroad track 224.

In this illustrative example, the analysis of weather event sources 230 can be performed using artificial intelligence (AI) system 237 in railway manager 212. Artificial intelligence system 237 can comprise one or more artificial intelligence components. For example, artificial intelligence system 237 can comprise at least one of a neural network, a cognitive system, a Bayesian network, fuzzy logic, or an expert system. In one illustrative example, a cognitive system in the form of IBM Watson can be used in artificial intelligence system 237. IBM Watson is available from International Business Machines Corporation. IBM Watson is configured to apply natural language processing, information retrieval, knowledge representation, automated reached reasoning, machine learning, computer vision, and other technologies.

In this illustrative example, railway manager 212 dispatches a set of unmanned aerial vehicles 216 to particular section 222 of railroad track 224 when probability 218 of safety issue 220 exceeds threshold 238. As depicted, threshold 238 can be selected in a number of different ways.

For example, when threshold 238 is 50 percent, probability 218 greater than 50 percent results in the dispatching of a set of unmanned aerial vehicles 216. In another example, when probability 218 is high, the set of unmanned aerial vehicles 216 is dispatched with threshold 238 being "moderate." The selection of threshold 238 may vary based on a number of different factors. For example, the availability of unmanned aerial vehicles 216 for dispatch may be used to set threshold 238. Further, threshold 238 can vary over time. For example, threshold 238 can vary as a function of unmanned aerial vehicle availability.

Threshold 238 can also be set based on the difficulty present for exploring area by other means. If multiple sites need inspection, threshold 238 can take into account the accessibility of the site. For example, a section of track that can be viewed by a person along a roadside is scored lower than a section of track away from easy viewing, such as a section of track passing through a forest. In this manner, threshold 238 is set such that unmanned aerial vehicles 216 are dispatched to the least humanly accessible sites.

In another example, threshold 238 can be set based upon at least one of level of risk or disruptions. For example, a low chance of track inspection being necessary may still result in deployment of unmanned aerial vehicles 216 if the potential safety hazard or disruption to a busy service is sufficiently high.

In this illustrative example, unmanned aerial vehicles 216 may be all of the same type or may be comprised of different types of unmanned aerial vehicles 216. Unmanned aerial vehicles 216 may be selected based on a distance to different portions of railroad tracks 208. For example, unmanned aerial vehicles 216 are selected to have sufficient fuel for battery power to reach different sections of railroad tracks 208, generate images 240, transmit images 240 to railway manager 212, and return for refueling or recharging.

Further, unmanned aerial vehicles 216 can also be selected for capabilities to avoid obstacles such as trees while flying low enough under treetops to generate images 240 of railroad track 224. For example, at least one of miniature unmanned aerial vehicles, micro air vehicles, man-portable unmanned aerial vehicles, or other suitable types of unmanned aerial vehicles 216 can be used.

For example, railway manager 212 may instruct the set of unmanned aerial vehicles 216 to fly to particular section 222 of railroad track 224. As depicted, the set of unmanned aerial vehicles 216 may be instructed to generate the number of images 240 while performing a set of maneuvers selected from at least one of following railroad track 224 or flying in a grid pattern in an area encompassing particular section 222 of railroad track 224.

Railway manager 212 can instruct the set of unmanned aerial vehicles 216 to generate the number of images 240 of railroad track 224 with a set of geomarkers 241 for the number of images 240. In this illustrative example, geomarkers 241 are metadata identifying locations wherein the number of images 240 were taken. Geomarkers 241 may also include timestamps for the set of images 240.

Railway manager 212 receives a number of images 240 of particular section 222 of railroad track 224 from the set of unmanned aerial vehicles 216 and generates risk score 242 for safety issue 220 at particular section 222 of railroad track 224 using the number of images 240. The number of images 240 may be received in a number of different ways. For example, the set of unmanned aerial vehicles 216 can transmit the number of images 240 over wireless communications links to railway manager 212. As another example, the set of unmanned aerial vehicles 216 can upload the number of images 240 to railway manager 212 after the set of unmanned aerial vehicles 216 has returned to base.

In this illustrative example, railway manager 212 can analyze the number of images 240 using artificial intelligence system 237. The analysis performed using artificial intelligence system 237 may include identifying objects in images 240 in determining whether the objects in images 240 indicate the presence of safety issue 220 at particular section 222 of railroad track 224. For example, the analysis of the number of images 240 may identify an area beneath railroad track 224 at particular section 222 that shows signs of flooding. The analysis may show an object such as a tree that is dangerously close to railroad track 224.

Based on this analysis, risk score 242 is assigned to particular section 222 of railroad track 224. Risk score 242 may be a percentage, a numerical value, or a label. For example, signs of water buildup beneath railroad track 224 may result in "medium risk" being assigned as risk score 242. Water erosion or a missing support beneath railroad track 224 of particular section 222 results in "high risk" being assigned as risk score 242.

As depicted, railway manager 212 performs action 244. Action 244 may be performed to resolve safety issue 220 using risk score 242, enabling railway manager 212 in computer system 214 to manage safety issues 210 for railway system 200. In this illustrative example, action 244 is selected from a group comprising dispatching a human operator to inspect particular section 222 of railroad track 224, generating an alert, sending a report, closing down particular section 222 of railroad track 224, rerouting a train in railway system 200, and other suitable actions.

Railway manager 212 may be implemented in software, hardware, firmware, or a combination thereof. When software is used, the operations performed by railway manager 212 may be implemented in program code configured to run on hardware, such as a processor unit. When firmware is used, the operations performed by railway manager 212 may be implemented in program code and data and stored in persistent memory to run on a processor unit. When hardware is employed, the hardware may include circuits that operate to perform the operations in railway manager 212.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with detecting safety issues with railroad tracks in a railway system. One or more technical solutions may provide a technical effect of enabling detecting greater types of safety issues as compared to current techniques. For example, one or more technical solutions may provide a technical effect of managing safety for a railway system in a more comprehensive manner that is unavailable with currently used techniques for detecting safety issues on railroad tracks in which the safety issues result from weather events. These currently used techniques, individually or in combination, do not provide a desired level of detection with a reduced use of resources for safety issues resulting from weather events. For example, with analyzing weather event sources and dispatching unmanned aerial vehicles, a railway manager can detect safety issues that may not be easily detected using visual inspections by railroad personnel riding in land vehicles or flying in air vehicles. As another example, a number of human resources in which railroad personnel driving on roads along railroad tracks can be reduced.

Further, one or more technical solutions may provide a technical effect of enabling quicker identification of safety issues with a lower use of resources. For example, one or more technical solutions identifies a probability of a safety issue on a railroad track using weather event sources such as wind weather data, social networks, and historical records. Based on probability, one or more technical solutions utilizes unmanned aerial vehicles to generate images of particular sections of railroad tracks that have probabilities of a safety issue that are greater than some threshold level. As depicted, railway manager 212 performs a two-part process in identifying safety issues 210 for railroad tracks 208. The two-part process includes identifying probability 218 using weather event sources 230 and then obtaining images 240 using a set of unmanned aerial vehicles 216 for analysis in generating risk score 242 for safety issues 210.

As a result, computer system 214 operates as a special purpose computer system in which railway manager 212 in computer system 214 enables identifying safety issues 210 for railroad tracks 208. In particular, railway manager 212 transforms computer system 214 into a special purpose computer system as compared to currently available general computer systems that do not have railway manager 212.

The illustration of railway safety environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, railway monitoring system 204 may be employed to manage one or more railway systems in addition to or in place of railway system 200. Further, the depicted example shows dispatching a set of unmanned aerial vehicles 216 to particular section 222 of railroad track 224. In other illustrative examples, multiple sets of unmanned aerial vehicles 216 can be dispatched to different sections of railroad tracks 208 at substantially the same time, staggered, or overlapping time periods. Additionally, some illustrative examples may omit the use of artificial intelligence system 237 and employ a logic engine that is driven by a policy. The policy is a set of rules and may include data use in applying a set of rules or information 226 from weather event sources 230 and the analysis of the number of images 240 received from the set of unmanned aerial vehicles 216.

Turning next to FIG. 3, a flowchart of a process for managing safety for a railway system is depicted in accordance with an illustrative embodiment. The processes in FIG. 3 can be implemented in hardware, software, or both. When implemented in software, the processes can take the form of program code that is run by one of more processor units located in one or more hardware devices in one or more computer systems. For example, these processes can be implemented in railway manager 212 running on computer system 214 in FIG. 2.

The process begins by receiving information from a set of weather event sources (step 300). In this illustrative example, the set of weather event sources is at least one of live weather data, a social network, historical records, or some other suitable source of weather event information. The historical records include records about railway system safety issues.

The process generates a probability of a safety issue for a particular section of a railroad track in a railway system using information from the set of weather event sources (step 302). The process dispatches a set of unmanned aerial vehicles to the particular section of the railroad track when the probability of the safety issue exceeds a threshold (step 304). The process receives a number of images of the particular section of the railroad track from the set of unmanned aerial vehicles (step 306).

The process generates a risk score for the safety issue at the particular section of the railroad track using the number of images (step 308). The process performs an action to resolve the safety issue using the risk score (step 310). The process terminates thereafter. This process for railway manager 212 running on computer system 214 enables computer system 214 to manage safety issues for the railway system.

In FIG. 4, a flowchart of a process for generating a probability of a safety issue is depicted in accordance with an illustrative embodiment. The process illustrated in this figure is an example of one implementation of step 302 in FIG. 3. In the illustrative example, the processes are implemented using artificial intelligence in railway manager 212. The artificial intelligence system can be a cognitive system that includes a visual recognition function as well as other components used to generate a probability of a safety issue being present.

In this example, the visual recognition function operates to provide an understanding of content contained in an image. For example, the visual recognition function can be configured to return attributes of damage. The attributes may include an identification of objects. For example, an image of fallen trees during a thunderstorm results in the function returning an identification of the fallen trees and rain. For example, the visual recognition function may include computer vision that provides for scene reconstruction, event detection, object recognition, and other suitable types of functions.

The process begins by identifying information from live weather data, social networks, and historical records for an area encompassing a particular section of railroad tracks (step 402). The size of the area may vary depending on the particular implementation. For example, the area may have a perimeter that is as far away as 100 yards, one mile, three miles, or some other distance from the particular section of the railroad track. The process compares the live weather data to historical records at the particular section to form a comparison (step 402). The process analyzes information from social networks to form an initial analysis (step 404). In this illustrative example, the information from the social networks includes at least one of images, comments, video, or other suitable information relating to the particular area.

The process generates a probability of a safety issue being present for the section of the railroad track using the comparison and the initial analysis (step 406). The process terminates thereafter.

Figure 5:
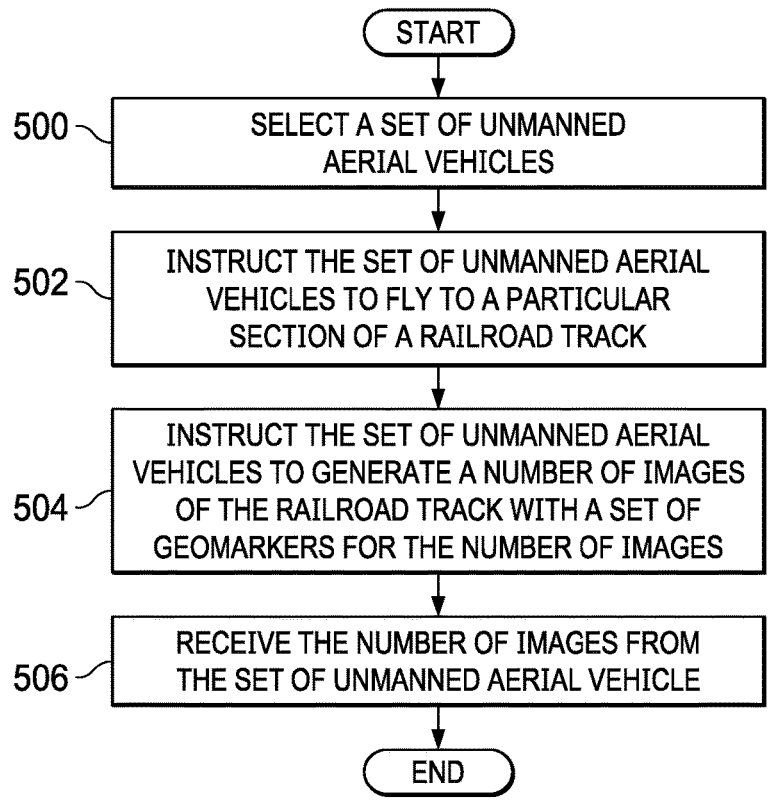
FIG. 5 is a flowchart of a process for dispatching a set of unmanned aerial vehicles in accordance with an illustrative embodiment.

Turning to FIG. 5, a flowchart of a process for dispatching a set of unmanned aerial vehicles is depicted in accordance with an illustrative embodiment. The process illustrated in FIG. 5 is an example of one implementation for step 304 in FIG. 3.

The process begins by selecting a set of unmanned aerial vehicles (step 500). In step 500, one or more unmanned aerial vehicles are selected for use in generating images for a particular section of railroad track. The process instructs the set of unmanned aerial vehicles to fly to the particular section of the railroad track (step 502). In step 502, the process may instruct the set of unmanned aerial vehicles by providing coordinates such as latitude, longitude, and altitude to the set of unmanned aerial vehicles as a waypoint or a destination.

The process instructs the set of unmanned aerial vehicles to generate a number of images of the railroad track with a set of geomarkers for the number of images (step 504). In step 504, the unmanned aerial vehicles are instructed to generate the number of images while performing a set of maneuvers. The set of maneuvers may be selected from at least one of following the railroad track, flying in a grid pattern in an area encompassing the particular section of the railroad track, or some other suitable type of maneuver.

In one illustrative example, the set of unmanned aerial vehicles may employ swarm robotics. The set of unmanned aerial vehicles may each fly over a portion of the particular area generating images in a coordinated manner. This coordination may be formed by the set of unmanned aerial vehicles cooperating as a group, wherein one of the unmanned aerial vehicles may coordinate the group, or railway manager 212 can coordinate the unmanned aerial vehicles.

The process receives the number of images from the set of unmanned aerial vehicle (step 506). The process terminates thereafter.

Figure 6:
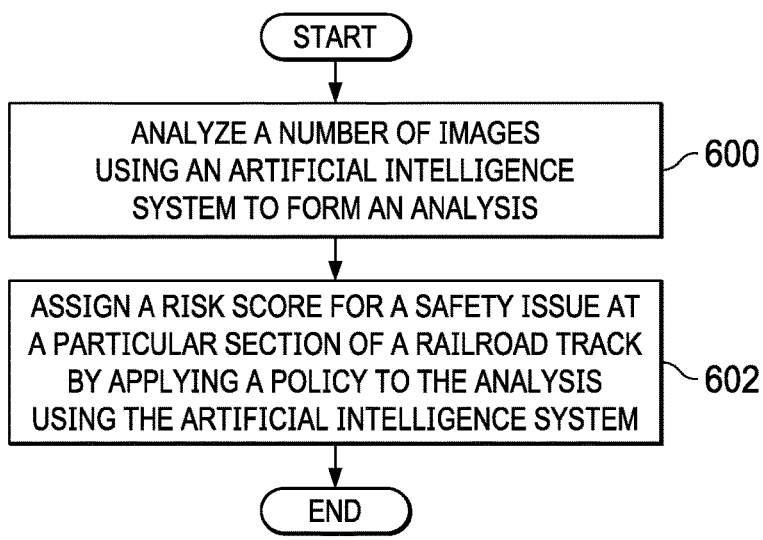
FIG. 6 is a flowchart of a process for generating a risk score for a safety issue in accordance with an illustrative embodiment.

With reference to FIG. 6, a flowchart of a process for generating a risk score for a safety issue is depicted in accordance with an illustrative embodiment. The process illustrated in FIG. 6 is an example of one implementation step 308 in FIG. 3. The process illustrated in this flowchart may be implemented in an artificial intelligence system using a visual recognition function as well as other functions used to generate a risk score.

The process begins by analyzing a number of images using an artificial intelligence system to form an analysis (step 600). In step 600, the process may employ an artificial intelligence system that includes a cognitive system that having a visual recognition function. The visual recognition function operates to provide an understanding of content contained in the number of images. The content in the images may include objects such as a tree, flowing water, railroad tracks, and other objects that may be used in the analysis of the number of images. Additionally, the cognitive system operates to define relationships between the objects. These relationships may include physical relationships such as distance, orientation, or other relationships that may be used in generating the risk score.

The process assigns the risk score for the safety issue at the particular section of the railroad track by applying a policy to the analysis using the artificial intelligence system (step 602). The process terminates thereafter.

In this illustrative example, a policy is one or more rules and information that may be used in applying the rules to the analysis of the number of images. The policy may contain a rule defining a risk score as a function of the type of object on a railway. For example, a branch may have a risk score that is "low risk," while a tree having a three-foot diameter falling on the railroad track may have a risk score that is "high risk." The policy also may contain rules defining risk scores based on a distance of an object from the railroad track. As another example, a rule in the policy may define water erosion under the railroad track as having a risk score that is "high risk."

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 7:
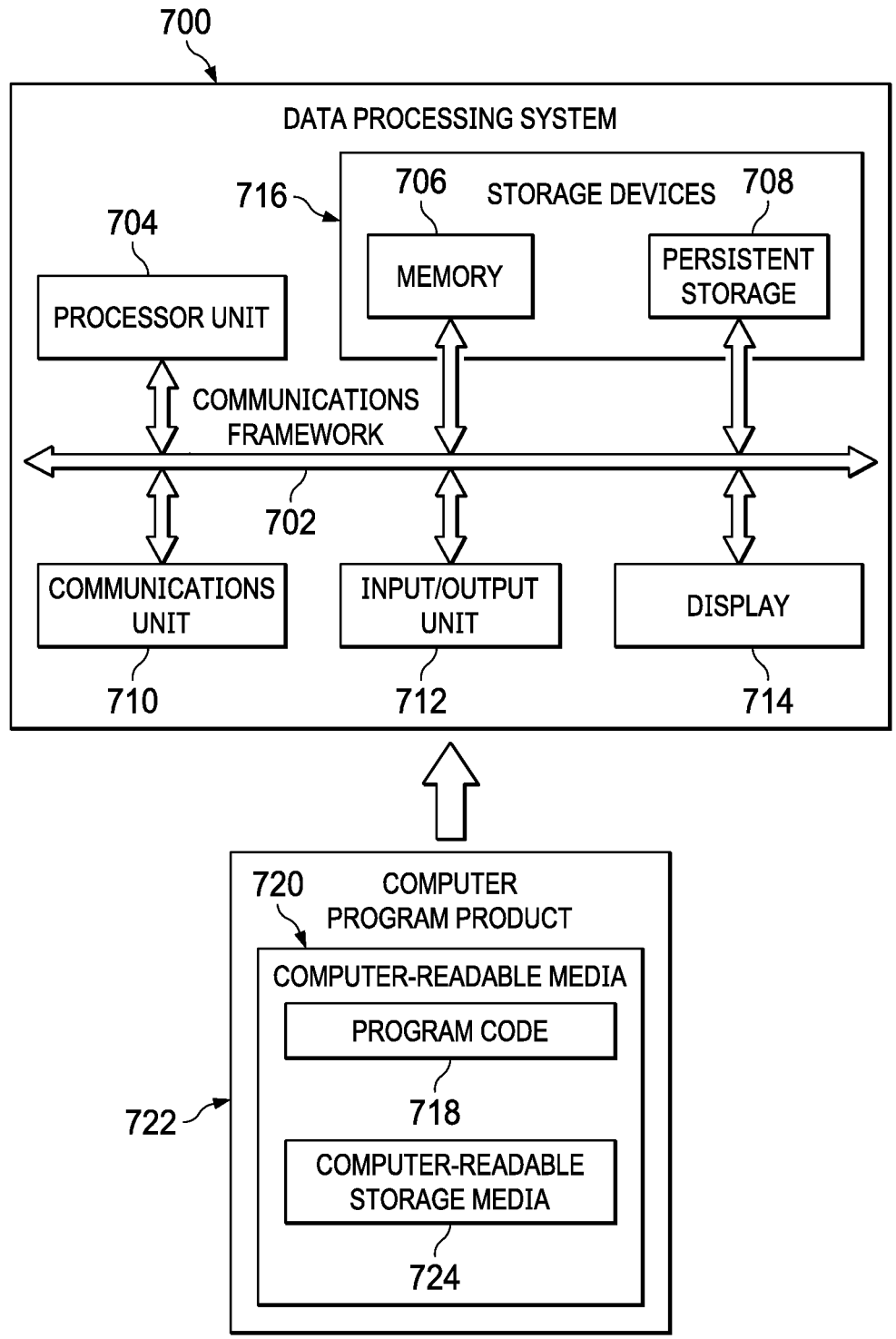
FIG. 7 is a block diagram of a data processing system in accordance with an illustrative embodiment.

Turning now to FIG. 7, a block diagram of a data processing system is depicted in accordance with an illustrative embodiment. Data processing system 700 may be used to implement server computer 104, server computer 106, and client devices 110 of FIG. 1; and data processing systems in computer system 214 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random-access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a solid-state drive (SSD), a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In the illustrative example, computer-readable media 720 is computer-readable storage media 724. In these illustrative examples, computer-readable storage media 724 is a physical or tangible storage device used to store program code 718 rather than a medium that propagates or transmits program code 718.

Alternatively, program code 718 may be transferred to data processing system 700 using a computer-readable signal media. The computer-readable signal media may be, for example, a propagated data signal containing program code 718. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

Thus, illustrative embodiments of the present invention provide a computer implemented method, computer system, and computer program product for managing safety for a railway system. In one illustrative example, a railway manager running on a computer system generates a probability of a safety issue for a particular section of a railroad track in the railway system using information from a set of weather event sources. The railway manager dispatches a set of unmanned aerial vehicles to the particular section of the railroad track when the probability of the safety issue exceeds a threshold and receives a number of images of the particular section of the railroad track from the set of unmanned aerial vehicles. The railway manager generates a risk score for the safety issue at the particular section of the railroad track using the number of images. The railway manager performs an action to resolve the safety issue using the risk score, enabling the computer system to manage safety issues for the railway system.

Thus, one or more illustrative examples provide one or more technical solutions for managing safety for a railway system in a comprehensive manner that is unavailable with currently used techniques. Further, one or more technical solutions may provide a technical effect of enabling quicker identification of safety issues with a lower use of resources. For example, one or more technical solutions identifies a probability of a safety issue on a railroad track using weather event sources such as live weather data, social networks, and historical records. Based on probability, one or more technical solutions utilizes unmanned aerial vehicles to generate images of particular sections of railroad tracks that have probabilities of a safety issue that are greater than some threshold level.

As depicted, railway manager 212 performs a two-part process in identifying safety issues for railroad tracks. The two-part process includes identifying a probability that a safety issue is present using weather event sources and then obtaining images using a set of unmanned aerial vehicles for analysis in generating a risk score for the safety issues.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing safety for a railway system, the method comprising:

generating, by a computer system, a probability of a safety issue for a particular section of a railroad track in the railway system using information from a set of weather event sources;

dispatching, by the computer system, a set of unmanned aerial vehicles to the particular section of the railroad track when the probability of the safety issue exceeds a threshold;

receiving, by the computer system, a number of images of the particular section of the railroad track from the set of unmanned aerial vehicles;

generating, by the computer system, a risk score for the safety issue at the particular section of the railroad track using the number of images; and performing, by the computer system, an action to resolve the safety issue using the risk score, enabling the computer system to manage safety issues for the railway system, wherein the safety issue at the particular section of the railroad track is selected from a group consisting of flooding of the railroad track, flooding under or below the railroad track, erosion, an obstruction on the railroad track, the obstruction within a selected distance of the railroad track, a fallen tree on the railroad track, a mudslide on the railroad track, or a rockslide on the railroad track, wherein dispatching, by the computer system, the set of unmanned aerial vehicles comprises:

instructing the set of unmanned aerial vehicles to fly to the particular section of the railroad track; and instructing the set of unmanned aerial vehicles to generate the number of images of the railroad track with a set of geomarkers for the number of images.

2. The method of claim 1, wherein generating, by the computer system, the risk score for the safety issue at the particular section of the railroad track using the number of images comprises:

analyzing the number of images using an artificial intelligence system to form an analysis; and assigning the risk score for the safety issue at the particular section of the railroad track by applying a policy to the analysis using the artificial intelligence system.

3. The method of claim 1, wherein the set of unmanned aerial vehicles is instructed to generate the number of images while performing a set of maneuvers selected from at least one of following the railroad track or flying in a grid pattern in an area encompassing the particular section of the railroad track.

4. The method of claim 1, wherein the action is selected from a group consisting of dispatching a human operator to inspect the particular section of the railroad track, generating an alert, sending a report, closing down the particular section of the railroad track, and rerouting a train in the railway system.

5. The method of claim 1, wherein the set of weather event sources is selected from at least one of live weather data, a social network, or historical records of railway system safety issues.

6. A railway monitoring system comprising:
a computer system; and
a railway manager running on the computer system, wherein the railway manager generates a probability of a safety issue for a particular section of a railroad track in a railway system using information from a set of weather event sources; dispatches a set of unmanned aerial vehicles to the particular section of the railroad track when the probability of the safety issue exceeds a threshold; receives a number of images of the particular section of the railroad track from the set of unmanned aerial vehicles; generates a risk score for the safety issue at the particular section of the railroad track using the number of images; and performs an action to resolve the safety issue using the risk score, enabling the computer system to manage safety issues for the railway system, wherein the safety issue at the particular section of the railroad track is selected from a group consisting of flooding of the railroad track, flooding under or below the railroad track, erosion, an obstruction on the railroad track, the obstruction within a selected distance of the railroad track, a fallen tree on the railroad track, a mudslide on the railroad track, or a rockslide on the railroad track, wherein in dispatching the set of unmanned aerial vehicles, the railway manager instructs the set of unmanned aerial vehicles to fly to the particular section of the railroad track and instructs the set of unmanned aerial vehicles to generate the number of images of the railroad track with a set of geomarkers for the number of images.

7. The railway monitoring system of claim 6, wherein in generating the risk score for the safety issue at the particular section of the railroad track using the number of images, the railway manager analyzes the number of images using an artificial intelligence system to form an analysis and assigns the risk score for the safety issue at the particular section of the railroad track by applying a policy to the analysis using the artificial intelligence system.

8. The railway monitoring system of claim 6, wherein the set of unmanned aerial vehicles is instructed to generate the number of images while performing a set of maneuvers selected from at least one of following the railroad track or flying in a grid pattern in an area encompassing the particular section of the railroad track.

9. The railway monitoring system of claim 6, wherein the action is selected from a group consisting of dispatching a human operator to inspect the particular section of the railroad track, generating an alert, sending a report, closing down the particular section of the railroad track, and rerouting a train in the railway system.

10. The railway monitoring system of claim 6, wherein the set of weather event sources is selected from at least one of live weather data, a social network, or a historical record of railway system safety issues.

11. A computer program product for managing safety for a railway system, the computer program product comprising:
a computer-readable storage media;
first program code, stored on the computer-readable storage media, for generating a probability of a safety issue for a particular section of a railroad track in the railway system using information from a set of weather event sources;
second program code, stored on the computer-readable storage media, for dispatching a set of unmanned aerial vehicles to the particular section of the railroad track when the probability of the safety issue exceeds a threshold;
third program code, stored on the computer-readable storage media, for receiving a number of images of the particular section of the railroad track from the set of unmanned aerial vehicles;
fourth program code, stored on the computer-readable storage media, for generating a risk score for the safety issue at the particular section of the railroad track using the number of images; and
fifth program code, stored on the computer-readable storage media, for performing an action to resolve the safety issue using the risk score, enabling a computer system to manage safety issues for the railway system, wherein the safety issue at the particular section of the railroad track is selected from a group consisting of flooding of the railroad track, flooding under or below the railroad track, erosion, an obstruction on the railroad track, the obstruction within a selected distance of the railroad track, a fallen tree on the railroad track, a mudslide on the railroad track, or a rockslide on the railroad track, wherein the second program code comprises:
program code, stored on the computer-readable storage media, for instructing the set of unmanned aerial vehicles to fly to the particular section of the railroad track; and
program code, stored on the computer-readable storage media, for instructing the set of unmanned aerial vehicles to generate the number of images of the railroad track with a set of geomarkers for the number of images.

12. The computer program product of claim 11, wherein the fourth program code comprises:
program code, stored on the computer-readable storage media, for analyzing the number of images using an artificial intelligence system to form an analysis; and
program code, stored on the computer-readable storage media, for assigning the risk score for the safety issue at the particular section of the railroad track by applying a policy to the analysis using the artificial intelligence system.

13. The computer program product of claim 11, wherein the set of unmanned aerial vehicles is instructed to generate the number of images while performing a set of maneuvers selected from at least one of following the railroad track or flying in a grid pattern in an area encompassing the particular section of the railroad track.

14. The computer program product of claim 11, wherein the action is selected from a group consisting of dispatching a human operator to inspect the particular section of the railroad track, generating an alert, sending a report, closing down the particular section of the railroad track, and rerouting a train in the railway system.

* * * * *